United States Patent [19]

D'Amato

[11] 4,259,692
[45] Mar. 31, 1981

[54] PROJECTION KINESCOPE AND METHOD OF OPERATION

[75] Inventor: Ralph J. D'Amato, Lancaster, Pa.

[73] Assignee: RCA Corporation, New York, N.Y.

[21] Appl. No.: 87,448

[22] Filed: Oct. 22, 1979

[51] Int. Cl.³ .............................................. H04N 5/74
[52] U.S. Cl. ...................................... 358/237; 358/60
[58] Field of Search ................................. 358/237, 60

[56] References Cited

U.S. PATENT DOCUMENTS

| 2,457,175 | 12/1948 | Parker . | |
| 3,505,464 | 4/1970 | Clingman, Jr. et al. . | |
| 3,975,766 | 8/1976 | Sano et al. | 358/65 |

*Primary Examiner*—Richard Murray
*Attorney, Agent, or Firm*—Eugene M. Whitacre; Glenn H. Bruestle; Dennis H. Irlbeck

[57] ABSTRACT

A projection kinescope comprises an evacuated envelope having a faceplate, a phosphor screen on the inner surface of the faceplate, and an electron gun. The electron gun generates a plurality of electron beams in a substantially vertical plane. The beams are directed to strike the screen at vertically-separated positions. A delay line is associated with an electron beam that is directed to strike the screen above another electron beam. The delay time of the delay line is sufficient to repeat the video information imparted by the electron beam first striking the same portion of the screen.

4 Claims, 3 Drawing Figures

PROJECTION KINESCOPE AND METHOD OF OPERATION

BACKGROUND OF THE INVENTION

This invention relates to projection-type kinescopes and particularly to a method for improving the spot size and phosphor linearity of projection kinescopes.

One type of projection television system uses three monochrome kinescopes, each having a cathodoluminescent screen with a different color emitting phosphor. The kinescopes project images through three lenses onto a reflective screen. The three different color images merge at the screen to form a composite color image.

The performance of such projection kinescopes is limited because of cathode current output limitations, space charge repulsion within the electron beams and nonlinearity of phosphor light output as a function of input electron beam energy. Because of the present low level of performance, the reflective screen in a projection system must be viewed in a darkened environment. Therefore, it is desirable to increase kinescope performance so that a projection kinescope may exhibit greater light output, thereby permitting the reflective screen to be viewed in greater ambient light or providing greater light output for theater viewing.

SUMMARY OF THE INVENTION

A projection kinescope according to the invention comprises an evacuated envelope having a faceplate, a phosphor screen on the inner surface of the faceplate, and an electron gun. The electron gun generates a plurality of electron beams in a substantially vertical plane. The beams are directed to strike the screen at vertically-separated positions. A delay line is associated with an electron beam that is directed to strike the screen above another electron beam. The delay time of the delay line is sufficient to repeat the video information inparted by the electron beam first striking the same portion of the screen.

DETAILED DESCRIPTION

Figure 1:
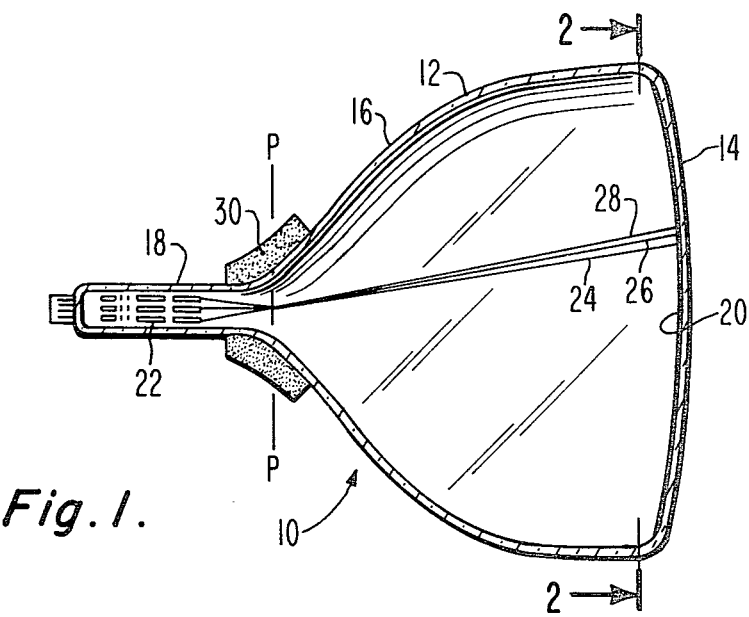
FIG. 1 is a cross-sectional side view of a projection kinescope in accordance with the invention.

FIG. 1 illustrates a side view of a projection kinescope 10 having an evacuated envelope 12 including a faceplate portion 14, a funnel portion 16 and a neck portion 18. The internal surface of the faceplate portion 14 is coated with a solid phosphor screen 20 cathodoluminescent in a single color. A three-beam inline electron gun 22 is positioned in the kinescope neck, with the plane of the three beams 24, 26 and 28 oriented vertically relative to the intended horizontal scan direction. A magnetic deflection yoke 30 is located on the outside of the envelope 12 surrounding the junction of the neck portion 18 with the funnel portion 16.

Figure 2:
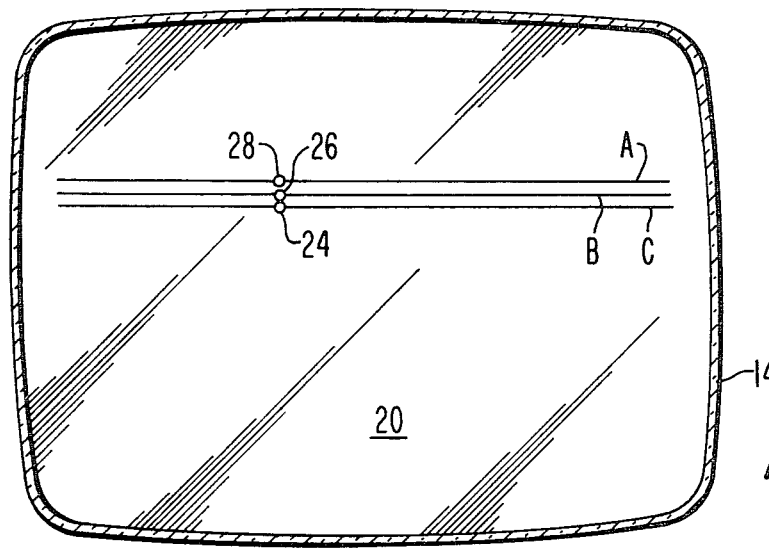
FIG. 2 is an interior view of the kinescope faceplate taken at line 2—2 of FIG. 1.

The electron gun 22 may be of any inline type, e.g., that described in U.S. Pat. No. 3,772,554 issued to R. H. Hughes on Nov. 13, 1973. Such a gun can be modified to converge the beams to crossover near the deflection plane P—P of the yoke 30. When the three beams 24, 26 and 28 strike the screen 20, they are vertically displaced from each other as shown especially in FIG. 2. All three beams 24, 26 and 28 traverse the same scan lines but at different times. For example, the beam 24 scans line A first. Then, while the beam 24 is scanning line B, the beam 26 scans line A. Thereafter, while the beam 24 is scanning line C and the beam 26 is scanning line B, the beam 28 scans line A. Therefore, each line A, B or C is scanned three times in succession during each frame, once by each beam.

Figure 3:
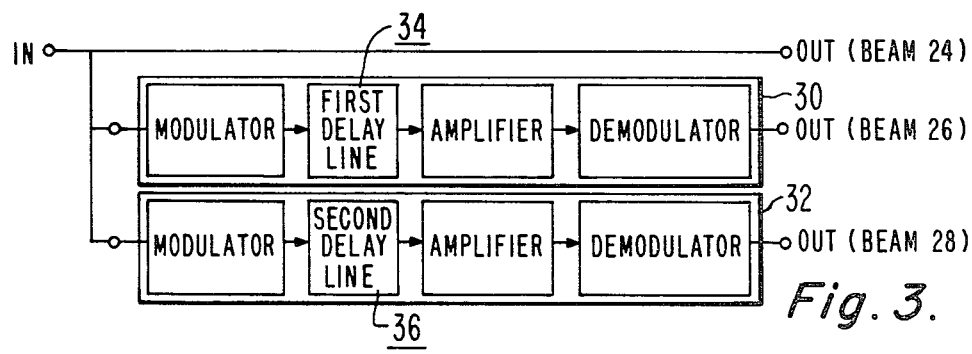
FIG. 3 is a schematic diagram of the video delay used with the kinescope of FIG. 1.

In order to accomplish this triple excitation of each scan line, delay lines are added to the modulation control circuit for the upper two beams 26 and 28 as shown in FIG. 3. These video delay lines may be video delay modules 30 and 32 such as manufactured by Corning Glass Works under model numbers VDM14 or VDM34. These modules 30 and 32 combine ultrasonic glass delay lines 34 and 36 with the necessary electronics to provide a video in/video out delay. The first delay line 34 provides a time delay equal to one horizontal scan period, and the second delay line 36 provides a time delay equal to two horizontal scan periods. In alternate versions of the kinescope, the gun may be modified to cause the beams to strike the screen with greater separation. In such cases, the delay for each of the upper beams may be greater than described but still some multiple of the horizontal scan period.

By using the foregoing modified kinescope and method, the cathode current output limitations, space charge and phosphor nonlinearity problems are reduced to one-third the values for a conventional projection kinescope.

What is claimed is:

1. A projection kinescope comprising:
    an evacuated envelope having a faceplate and a single color-emitting continuous phosphor screen on the inner surface of the faceplate;
    an electron gun for generating a plurality of electron beams in a substantially vertical plane, the beams being directed to strike the screen at vertically-separated positions; and
    a delay line associated with one of the electron beams directed to strike the screen above another of the electron beams, the delay time of the delay line being sufficient to repeat the video information imparted by the electron beam first striking the same portion of the screen.

2. The projection kinescope as defined in claim 1, wherein the electron gun generates three vertically-aligned electron beams and the video signal controlling each of the two electron beams that strike the screen above the remaining electron beam is delayed a multiple of the horizontal scan period.

3. The projection kinescope as defined in claim 2, wherein the periods for delay of the video signals for the two electron beams are one and two horizontal scan periods.

4. A method of operating a projection kinescope, comprising:
    projecting a plurality of vertically-aligned electron beams to strike a screen of said kinescope, wherein said electron beams are vertically spaced from each other when they strike said screen;
    starting at the top of said screen, scanning said beams horizontally across said screen a plurality of times with each successive scan being vertically lower on the screen; and
    delaying the video signals controlling the electron beams that strike said screen above the lowest electron beam a sufficient time period to repeat the video information imparted by the lowest electron beam to the same location of the screen.

* * * * *